United States Patent
Yamazaki et al.

(10) Patent No.: US 7,158,131 B2
(45) Date of Patent: Jan. 2, 2007

(54) IMPLICIT FUNCTION RENDERING METHOD OF NONMANIFOLD, DIRECT DRAWING METHOD OF IMPLICIT FUNCTION CURVED SURFACE AND PROGRAMS THEREOF

(75) Inventors: Shuntaro Yamazaki, Wako (JP); Kiwamu Kase, Wako (JP); Katsushi Ikeuchi, Yokohama (JP)

(73) Assignee: Riken, Saitama (JP)

( * ) Notice: Subject to any disclaimer, the term of this patent is extended or adjusted under 35 U.S.C. 154(b) by 431 days.

(21) Appl. No.: 10/615,782

(22) Filed: Jul. 10, 2003

(65) Prior Publication Data

US 2004/0068530 A1 Apr. 8, 2004

(30) Foreign Application Priority Data

Oct. 8, 2002 (JP) ............................. 2002-295332

(51) Int. Cl.
*G06T 15/00* (2006.01)
(52) U.S. Cl. ...................................... 345/419
(58) Field of Classification Search ................ None
See application file for complete search history.

(56) References Cited

U.S. PATENT DOCUMENTS 4,965,844 A * 10/1990 Oka et al. .................. 345/581

OTHER PUBLICATIONS

Hubeli et al. Fairing of Non-Manifolds for Visualization. IEEE Visualization. Proceedings of the conference on Visualization '00. IEEE Computer Society Press. Los Alamitos, CA. 2000.*

J. Bloomenthal, Polygonization of Implicit Surfaces, Computer Aided Geometric Design, 5:341-355, 1987.

J. Bloomenthal and K. Ferguson, Polygonization of Non-Manifold Implicit Surfaces, SIGGRAPH '95, pp. 309-316, 1995.

M. Brady et al., Two-Phase Perspective Ray Casting for Interactive Volume Navigation, Visualization 97, pp. 183-189, 1997.

Klaus Engel et al., High Quality Pre-Integrated Volume Rendering Using Hardware-Accelerated Pixel Shading, In Eurographics/SIGGRAPH Workshop on Graphics Hardware '01, pp. 9-16, 2001.

H.C. Hege et al., A Generalized Marching Cubes Algorithm Based on Non-Binary Classifications, Technical Report, Konrad-Zuse-Zentrum fur Informationstechnik Berlin, 1997.

Philippe Lacroute et al., Fast Volume Rendering Using A Shear-Wrap Factorization of the Viewing Transformation, SIGGRAPH '94, pp. 451-458, 1994.

(Continued)

*Primary Examiner*—Ulka Chauhan
*Assistant Examiner*—Peter-Anthony Pappas
(74) *Attorney, Agent, or Firm*—Griffin & Szipl, P.C.

(57) ABSTRACT

An implicit function field of a nonmanifold is held in a form of volume data; a value of an implicit function at a point between lattice points is decided by interpolation; and if a difference in code distances between two adjacent voxels to be interpolated is larger than a fixed width, no surface is formed between the voxels. Furthermore, an entered curved surface is broken down into curved surface patches which enable determination of a front and a back; numbers are given to the front and the back, respectively, to be distinguished from each other; and a space is classified into a plurality of regions by using the number of a surface of a nearest point.

5 Claims, 8 Drawing Sheets

NONMANIFOLD SHAPE RENDERED
IN IMPLICIT FUNCTION BY PRESENTED METHOD

OTHER PUBLICATIONS

W.E. Lorenson et al., Marching Cubes: A High Resolution 3D Surface Construction Algorithm, SIGGRAPH '87, pp. 163-169, 1987.

J. Rossignac et al., SGC: A Dimension-Independent Model for Pointsets with Internal Structures and Incomplete Boundaries, Geometric Modeling for Product Engineering, 1989.

H. Tuy et al., Direct 2-D Display of 3-D Objects, IEEE Mag, Computer Graphics and Applications, 4 (10) : 29-33, 1984.

A.P. Witkin et al., Using Particles to Sample and Control Implicit Sufaces, SIGGRAPH '94, 1994.

Shuntaro Yamazaki et al. Nonmanifold Implicit Surfaces Based on Discontinuous Implicitization and Polygonization, Geometric Molding and Processing, pp. 138-146, 2002.

* cited by examiner

FIG. 1

············ original surface
⎯⎯→ nearest point
············ interpolated surface

SURFACE RECONSTRUCTED BY
CODE DISTANCE FIELD AND LINEAR INTERPOLATION

NONMANIFOLD SHAPE RENDERED IN IMPLICIT FUNCTION
BY CONVENTIONAL METHOD

NONMANIFOLD SHAPE RENDERED
IN IMPLICIT FUNCTION BY PRESENTED METHOD

DRAWING USING TEXTURES ON TWO ADJACENT SLICES

- CODE DISTANCE $$f(p) = \pm d$$

- $d$: Euclidean DISTANCE
  - $f$: FUNCTION VALUE ON SURFACE
  - $f>0$: SURFACE ● +
  - $f<0$: BACKSIDE ● −

- LINEAR INTERPOLATION

ORIGINAL SURFACE

RECONSTRUCTED SURFACE

FIG.10A

BOUNDARY ON SURFACE

FIG.10B

BRANCH ON SURFACE

FIG.11

BOUNDARY ON SURFACE

FIG.12

BRANCH ON SURFACE

FIG.13

- CODE DISTANCE : $f(p) = \pm d$

- REGION DISTANCE : $f(p) = \min(d, 2^B) + 2^B i$

FIG.14

$p = (u-t)/(u-v)$ ✗ incorrect distance

$\begin{cases} u \in [2^B i, 2^B(i+1)] \\ v \in [2^B j, 2^B(j+1)] \\ 0 < (u - 2^B i) + (v - 2^B j) \leq w \end{cases}$ $p = \dfrac{u - 2^B i}{(u - 2^B i) + (v - 2^B j)}$ p: POSITION OF INTERPOLATION SURFACE

FIG.15A

LINEAR INTERPOLATION

FIG.15B

SURFACE WHERE THERE IS BOUNDARY

FIG.16A

LINEAR INTERPOLATION

FIG.16B

SURFACE WHERE THERE ARE BRANCH AND BOUNDARY

FIG.17A implicit surface rendering (volume=$128^3$)

FIG.17B implicit surface rendering (volume=$256^3$)

IMPLICIT FUNCTION RENDERING METHOD OF NONMANIFOLD, DIRECT DRAWING METHOD OF IMPLICIT FUNCTION CURVED SURFACE AND PROGRAMS THEREOF

This application claims priority from Japanese Patent Application No. 295332/2002, filed Oct. 8, 2002, the entire disclosure of which is incorporated herein by reference.

BACKGROUND OF THE INVENTION

1. Technical Field of the Invention

The present invention relates to an implicit function rendering method of a nonmanifold, a direct drawing method of an implicit function curved surface and programs thereof.

2. Description of the Related Art

When a surface shape of a three-dimensional object is rendered by a computer, parametric rendering is widely used, which defines the shape by a coordinate value of the surface of the object. As examples, free curved surface rendering used by a computer-aided design (CAD), polygon rendering used by a virtual reality model and in an entertainment field, etc. can be cited. Parametric rendering has a feature that a data structure is intuitive and easy to understand, a shape can be rendered by a relatively small amount of data, and use of high-speed drawing hardware is easy.

On the other hand, when a process such as deformation of a surface shape or a set operation is carried out, it is often convenient to use implicit function rendering, which uses a function of an implicit form to indirectly render a curved surface. This rendering is used in fields of modeling, shape processing, physical simulation, etc. This rendering form has a feature that it facilitates a complex process, because of its simple data structure and its suitability for hierarchization or parallelization of the process. Parametric rendering and implicit rendering of a curved surface have advantages and disadvantages. Capability of selecting the form in accordance with a process is preferably provided, and, in such a case, a need arises to convert both forms.

As prior art documents concerning the present invention, the following can be cited.

[Non-patent Document 1]
J. Bloomenthal, Polygonization of implicit surfaces, Computer Aided Geometric Design, 5:341–355, 1988.

[Non-patent Document 2]
J. Bloomenthal, Introduction to Implicit Surface, Morgan Kaufmann Publishers, Inc., 1997.

[Non-patent Document 3]
J. Bloomenthal and K. Ferguson, Polygonization of nonmanifold implicit surfaces, In SIGGRAPH '95, pages 309–316, 1995.

[Non-patent Document 4]
M. Brady, K. Jung, H. T. Nguyen and T Nguyen, Two-phase perspective ray casting for interactive volume navigation, In Visualization 97, pages 243–56, 1997.

[Non-patent Document 5]
K. Engel, M. Kraus and T. Ertl, High-quality pre-integrated volume rendering using hardware-accelerated pixel shading, In Eurographics/SIGGRAPH Workshop on Graphics Hardware '01, pages 9–16, 2001.

[Non-patent Document 6]
H. C. Hege, M. Seebas, D. Stalling and M. Zockler, A generalized marching cubes algorithm based on non-binary classifications, Technical report, Konrad-Zuse-Zentrum fur Information stechnik (ZIB), 1997.

[Non-patent Document 7]
Philippe Lacroute and Marc Levoy, Fast volume rendering using a shear-warp factorization of the viewing transformation, In SIGGRAPH '94, pages 451–458, 1994.

[Non-patent Document 8]
W. E. Lorensen and H. E. Cline, Marching cubes: a high resolution 3d surface reconstruction algorithm, In SIGGRAPH '87, pages 163–169, 1987.

[Non-patent Document 9]
J. Rossignac and M. O'Connor, SGC:A dimension independent model for pointsets with internal structures and incomplete boundaries, In Geometric Modeling for Product Engineering, pages 145–180, 1990.

[Non-patent Document 10]
H. Tuy and L. Tuy, Direct 2d display of 3d objects, IEEE Mag, Computer Graphics and Applications, 4(10):29–33, 1984.

[Non-patent Document 11]
A. P. Witkin and P. S. Heckbert, Using particles to sample and control implicit surfaces, In SIGGRAPH '94, pages 269–278, 1994.

[Non-patent Document 12]
Shuntaro Yamazaki, Kiwamu Kase and Katsushi Ikeuchi, Nonmanifold implicit surfaces based on discontinuous implicitization and polygonization, In Geometric Modeling and Processing, pages 138–146. IEEE, July 2002.

Many methods have been presented concerning conversion of implicit function rendering into parametric rendering. Especially, conversion into a triangle mesh can be carried out stably and at a high speed. However, methods for converting parametric rendering into implicit function rendering do not always provide good results. In the conventional implicit function rendering, a surface to be handled is limited to two kinds of manifolds because of use of a continuous real valued function for defining a function field. Thus, if there are nonmanifold characteristics in an entry, for example, if there is a boundary on a curved surface and a branch on a surface, there is a problem that these portions are lost to greatly change shapes.

On the other hand, implicit function rendering itself has sufficient information to represent a curved surface. However, since a value to be held as data is not directly connected to a geometric shape of the curved surface, the surface must be made visible in order to check a real shape. When shape designing is carried out by using the implicit function curved surface, however, remeshing must be carried out because of a change in a function field made by a process such as deformation sequentially updated during the process of surface mixing or deformation, and, consequently, the process takes time. Additionally, as a surface shape becomes more complex, the number of formed polygons is increased, creating a problem of a slow drawing speed.

SUMMARY OF THE INVENTION

The present invention is designed to solve the foregoing problems and to satisfy requirements. That is, a first object of the present invention is to provide an implicit function rendering method of a nonmanifold, which converts a nonmanifold curved surface from parametric rendering into implicit function rendering while correctly holding its shape even if there are nonmanifold characteristics in an entry, for example, there is a boundary and a branch on the curved surface, and a program therefor.

A second object of the present invention is to provide a direct drawing method of an implicit function curved surface, which can deal with updating of an implicit function curved surface by deformation or the like at a high speed, carry out high-speed drawing even if a shape is complex, and thereby display an implicit function field at an interactive speed, and a program therefor.

According to the present invention, an implicit function rendering method of a nonmanifold is provided, which is characterized in that an implicit function field of a nonmanifold is held in a form of volume data, a value of an implicit function at a point between lattice points is decided by interpolation, and if a difference in code distances between two adjacent voxels to be interpolated is larger than a fixed width, no surface is formed between the voxels.

By this method, when there is a boundary on a curved surface, it is possible to prevent formation of an unnecessary surface by interpolation.

According to a preferred embodiment of the present invention, only when the following relations are all satisfied, $$u \in (-\infty), t) \quad (2)$$

$$v \in [t, \infty] \quad (3)$$

$$0 < ((-u)-t)+(v-t) < \alpha w \quad (4)$$

but $\alpha (\geq 1)$, wherein w is a space between two optional sample points; and u and v ($u \leq v$) are values, respectively, there is a surface between these two points.

By this method, if a difference in code distances between the two adjacent voxels to be interpolated is larger than the fixed width, it is possible to prevent formation of any surfaces between the voxels.

Additionally, a surface position q ($\in [0, 1]$) is normalized so that a value can be on a lattice point of u when q=0 and can be on a lattice point of v when q=1, and the position q where there is a surface is obtained by the following equation:

$$q=(t-u)/(v-u) \quad (5)$$

By this method, even if there is a boundary on a curved surface, it is possible to obtain a surface position without any mistakes.

According to the present invention, an implicit function rendering method of a nonmanifold is provided, which is characterized in that an entered curved surface is broken down into curved surface patches which enable determination of a front and a back, numbers are given to the front and the back, respectively, to be distinguished from each other, and a space is classified into a plurality of regions by using the number of a surface of a nearest point.

By this method, even if there is a branch on a surface, it is possible to prevent elimination of a part of the surface connected at a branch portion.

According to a preferred embodiment of the present invention, (1) an input nonmanifold curved surface is divided along a branch line, broken down into curved surface patches having no branches;
(2) numbers i are allocated to the patches in an obtained order, a frond and a back of each patch are distinguished from each other, a number $i^+$ is given to the front, and a number $i^-$ is given to the back;
(3) a space is sampled by a lattice point p; and
Euclid distance $d_E(p)$ to the curved surface and number i(p) of a surface of a nearest point are allocated to the lattice point;
(4) for each lattice point p, $i(p_n)$ is investigated at six adjacent points $p_n$, and groups of (i(p), $i(p_n)$) where $i(p) \neq i(p_n)$ are enumerated;
(5) a group of new numbers is substituted for the group of numbers allocated above, but if the numbers which are first $i^+$ and $i^-$ become the same numbers as a result of the substitution, no substitution is carried out for a combination thereof, whereby numbers are arrayed in order from 0 after said substitution; and
(6) in accordance with a substitution table, a region number i(p) is rewritten at each lattice point p, and an implicit volume function of a real value is comprised of the obtained volume region number i(p) and the Euclid distance $d_E(p)$ to the surface at each voxel.

By this method, the space is classified into a plurality of regions by using the number of the surface of the nearest point to enable implicit function rendering of the curved surface where there is a branch.

A distance $d^i_s$ included in a distance i is as follows:

$$d^i_s \in [D_s i, D_s(i+1)] \quad (6)$$

wherein $D_s$ is a width of each divided region of a real valued space representing a distance; and in a position p of each voxel, a region distance $f_s(p)$ is calculated from $d_E(p)$ and i(p) by the following equation:

$$f_s(p)=\min(d_E, 2^B-\epsilon)+2^B i(p) \quad (7),$$

$\epsilon (>0)$ is set to a minute positive real number to round down $d_E(p)$ so that fs(p) can be included in a half-open section of (6), wherein $$d_E=\sqrt{(x-X)^2+(y-Y)^2+(z-Z)^2}$$

where the coordinate (x, y, z) is a lattice point, and the coordinate (X, Y, Z) is the point closest to a curved surface from the lattice point and wherein $2^B$ is a range of permissible region distance values in one dimension.

By this method, even if there is a branch on the curved surface, it is possible to obtain a surface position without any mistakes.

Moreover, only when the followings are all satisfied, $$u \in (2^B i, 2^B(i+1)) \quad (8)$$

$$v \in [2^B j, 2^B(j+1)) \quad (9)$$

$$0 < (u-2^B i)+(v-2^B j) < \alpha w \quad (10)$$

but $i, j$ ($0 \leq i \leq j \leq n-1$), $\alpha (\geq 1)$, wherein w is a space between two optional sample points; and u and v ($u \leq v$) are values, respectively, there is a surface between these two points, and
wherein with respect to two sample points A and B, the designations i, j, u, v, n, and a are defined as follows:
i=region number of the point A,
j=region number of the point B,
u=region distance of the point A,
v=region distance of the point B,
n=total number of regions in which the region code distance is defined, α=a parameter that makes it possible to generate a cured surface between the points A and B, even if the curved surface exists between the points A and B, and the points closest to the curved surface do no conform to each other.

By this method, if a difference in region distance functions between the two adjacent voxels to be interpolated is larger than a fixed width, it is possible to prevent formation of any surfaces between the voxels.

Additionally, a surface position q ($\in[0, 1]$) is normalized so that a value can be on a lattice point of u when q=0 and can be on a lattice point of v when q=1, and the position q where there is a surface is obtained by the following equation:

$$q=(u-2^B i)/((u-2^B i)+(v-2^B j)) \quad (11)$$

By this method, even if there is a boundary on a curved surface, it is possible to obtain a surface position without any mistakes.

According to the present invention, a direct drawing method of an implicit function curved surface is provided, which is characterized in that a texture $T_{front}$ representing a volume value of a slice front side and a texture $T_{back}$ representing a volume value of a slide backside are used to interpolate and display a volume value of a region surrounded with the slice front side and the slice backside.

By this method, it is possible to reflect an influence of the entire volume including a region of no slices in a drawing result, whereby moire can be eliminated.

According to a preferred embodiment of the present invention, intersection points between a visual line and the slice front side and the slice backside are calculated; and from a textural value $t_{front}$ of the slice front side and a textual value $t_{back}$ of the slice backside, an influence of a volume located on the visual line between the slices on a color and a degree of transparency observed in this position is calculated to be displayed on a polygon.

By this method, it is possible to obtain a correct result even in drawing which uses a small number of slices.

Additionally, a process of calculating an observed color and an observed degree of transparency from the group of the textural value $t_{front}$ and the textural value $t_{back}$ is carried out beforehand; and a result thereof is saved as a two-dimensional texture in a graphics card on a simplified chart to be referred to by using a texture combining function during drawing.

By this method, the amount of calculation is reduced to enable a high-speed drawing process.

An implicit function curved surface represented by a region distance field volume is converted into such a form as to be used as a 3D texture; and with respect to a group of optional region distances constituted of the textural values $t_{front}$, $t_{back}$, a process of calculating a color and a degree of transparency observed therebetween is carried out beforehand to prepare a simplified chart, whereby a drawing color is decided.

According to this method, a correct displaying result can be subjected to a high-speed drawing process.

Furthermore, according to the present invention, a computer program is provided, which is characterized by causing a computer to execute the method of claims 1 to 3.

By using this computer program, even updating of the implicit curved surface by deformation or the like can be dealt with at a high speed, and drawing can be carried out at a high speed even when a shape is complex, whereby an implicit function field can be displayed at an interactive speed.

Other objects and advantageous features of the present invention will become apparent in the following description made with reference to the accompanying drawings.

DESCRIPTION OF THE PREFERRED EMBODIMENT

Hereinafter, the preferred embodiments of the present invention will be described with reference to the accompanying drawings.

1. The present invention provides a method which uses a region distance function to generate an implicit function volume, and uses a discontinuous function to expand a value thereof by interpolation, thereby rendering a parametric curved surface of a nonmanifold in an implicit function.

There is also provided a method which applies a volume rendering method to an implicit function field defined by the method of the present invention, and directly draws a curved surface from the implicit function field subjected to lattice point sampling. By using this method, an implicit function curved surface of a manifold or a nonmanifold can be drawn at a high speed irrespective of complexity of a surface shape.

As a specific algorithm, a method which receives a triangle mesh and outputs volume data obtained by subjecting an implicit function field to lattice point sampling will be described.

This method can be efficiently mounted by using a texture combining function to program a graphics card, and a high image quality curved surface can be displayed at an interactive speed. The speed is constant irrespective of a surface shape to enable handling of manifold and nonmanifold curved surfaces.

In short, main features of the present invention are the following two.

(1) There is provided a method which converts a parametric curved surface into implicit function rendering. Especially, an algorithm is provided which forms a volume implicit function field from an optional triangle mesh, and extracts an implicit function curved surface therefrom.

(2) There is provided a method which draws manifold and nonmanifold implicit function curved surfaces by applying a volume rendering method.

2. Related Studies 2.1 Implicit Function Rendering of Nonmanifold Curved Surface Implicit function rendering focuses on handling of only a manifold curved surface. However, Rossignac et al. have pointed out a possibility of rendering a nonmanifold curved surface in implicit function by using a vector-valued function [Non-patent document 9]. Based on this, Bloomenthal et al. have presented a method for rendering a curved surface as an implicit function curved surface [Non-patent document 3].

However, no clear methods have been provided to constitute an implicit field of a form to be handled by the above method from a curved surface generally given by parametric rendering. According to the present invention, definition of a nonmanifold curved surface is made clear, and the curved surface included in the definition is described to be sufficiently practical. Then, a method is provided, which converts an optional parametric curved surface included in the definition into implicit function rendering.

2.2 Visualization of Implicit Function Curved Surface

The implicit function curved surface is compatible to visualization by ray tracing. By using this method, it is possible to make a surface visible by a high image quality [Non-patent document 2]. However, by this method, drawing at an interactive speed is difficult because a process takes time.

As a method for greatly increasing a drawing speed by simplifying rendering, Witkin et al. have presented a displaying method which uses a particle system. However, since this method assumes that an implicit function enables differentiation on a curved surface, it cannot be applied to an implicit function curved surface expanded to a nonmanifold.

By converting the implicit function curved surface into a triangle mesh, it is possible to achieve a high speed of a drawing process. Bloomenthal et al. have presented a method which divides an implicit function field rendering a curved surface into tetrahedrons, and forms each tetrahedron in a triangle mesh [Non-patent document 1]. This method is expanded to a certain nonmanifold [Non-patent document 3].

On the other hand, Lorensen et al. have presented a method which uses hexahedron division of an implicit function field to form the implicit function field in a triangle mesh [Non-patent document 8], and it has subsequently been expanded to a nonmanifold shape [Non-patent document 6], [Non-patent document 12].

According to these methods, because of a need to form the mesh from the function field before the drawing process, it is necessary to carry out remeshing when the function field is changed by a process such as deformation, and the process takes time. Additionally, as the surface shape becomes more complex, the number of formed polygons is increased, consequently creating a problem of a slow drawing speed.

According to the method of the present invention, since the surface is made visible, even updating of the implicit function field by deformation or the like can be dealt with at a high speed. Moreover, since the drawing can be carried out irrespective of complexity of the shape, the drawing speed is constant.

3. Implicit Function Rendering of Nonmanifold Curved Surface 3.1 Implicit Function Curved Surface For a curved surface $S \subset R^3$ in a three-dimensional space, consideration is given to a group of a real number t and a real valued function f(p) which satisfies the following:

$$p \in S \Leftrightarrow f(p) = t \qquad (1)$$

However, $p \in R^3$ is a point in the three-dimensional space. A code f can be considered to be a function for returning a value in accordance with a distance to S, and S is an equivalent surface where a value of f is t. Definition by a form of a right side of the equation (1) of the curved surface S is referred to as "implicit function rendering", and S is referred to as an "implicit function curved surface" at this time.

When a function field defined by the real valued function f is processed by a computer, f must be sampled. Thus, sampling is carried out at an f lattice point beforehand to hold a result in a form of volume data, whereby a process for the implicit function field can be efficiently carried out. According to the present invention, this volume data is referred to as an "implicit function volume", and the implicit function field is defined by a volume. If the implicit function field is given by a volume, a value of an implicit function at a point between lattice points is decided by interpolating a value at a sampling point. That is, in order to define the implicit function curved surface by the function value t and the implicit function volume on the surface, a distance function for defining an implicit function field and an interpolation function for deciding a real surface position from the sampling point are both necessary.

Figure 1:
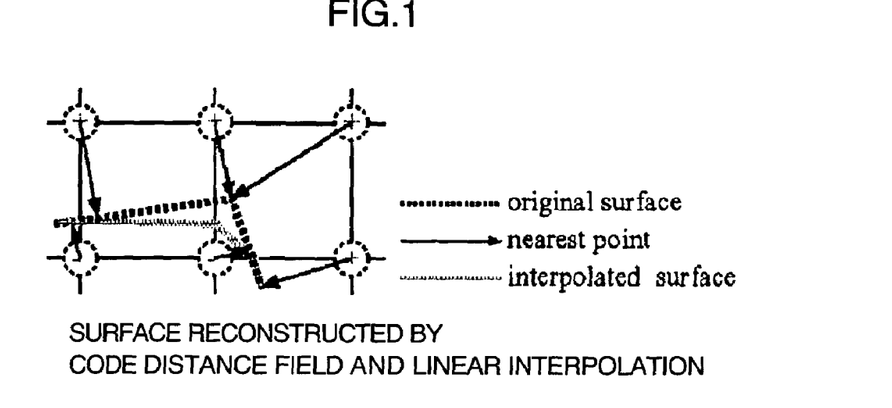
FIG. 1 is a two-dimensional schematic view showing a surface reconstructed by a code distance field and linear interpolation.
Figure 9:
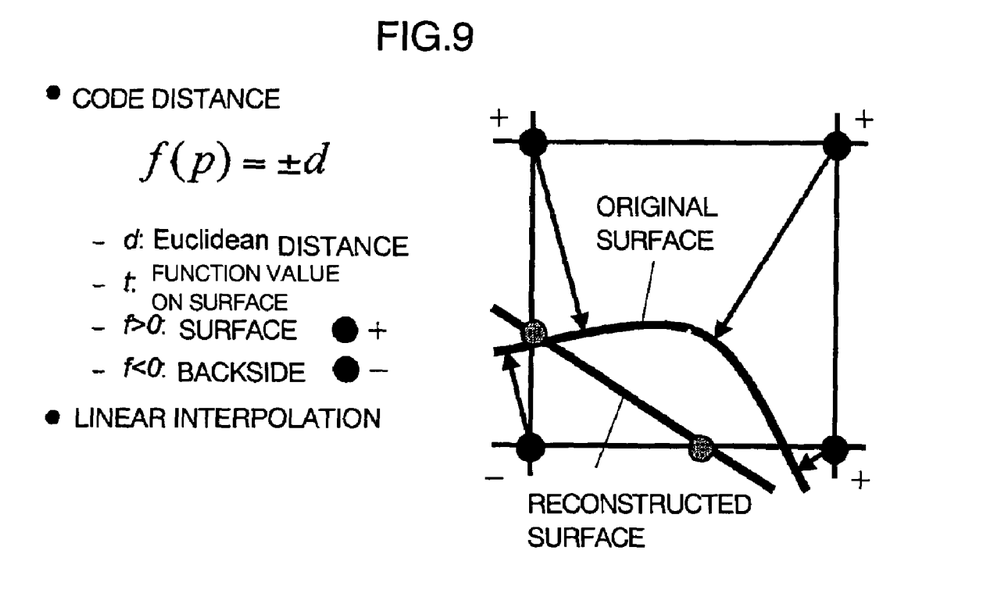
FIG. 9 is a two-dimensional schematic view similar to that of FIG. 1 showing a surface reconstructed by a code distance field and linear interpolation.

Definition of implicit function rendering for a certain curve surface is not limited to one in number. However, in order to stably constitute the implicit function field even if a shape of the curved surface is complex with respect to a sampling width, a code distance function is frequently used to form the implicit function field. This function returns a positive code to Euclid distance to the curved surface when a nearest point is in a front side of the surface, or a negative code when it is in a backside. In the implicit function volume generated by using this function, a value between lattice points can be obtained by linear interpolation from a value at a peripheral lattice point. FIGS. 1 and 9 show two-dimensional schematic examples of this situation. In the drawings, a function value is interpolated only on a side of a lattice to decide positions of surfaces, and such surface positions are connected to reconstruct a surface.

3.2 Nonmanifold Curved Surface

In a three-dimensional space, "set S is a 2-manifold" means that an endlessly small neighborhood at an optional point on S is inphase with a two-dimensional disc. Hereinafter, when a term "manifold" is used, it indicates a 2-manifold. If an implicit function field is given by linear interpolation of a sampled value, a function value can be differentiated at an optional point in the space. Thus, a neighborhood at an optional point p on the equivalent surface can be approximated to a very small place of a normal $\nabla f$, and an implicit function curved surface is a manifold at this time.

On the other hand, "S is a nonmanifold" means that in a region near a certain point on the surface, only one coordinate axis can be taken, or there are three or more two-dimensional local coordinate systems to be taken.

A shape handled by the present invention is a parametric curved surface, especially a curved surface to be rendered in a triangle mesh. Triangles are manifolds except boundaries as long as self intersection is not taken into consideration. Accordingly, it is only "a triangle boundary" where there is a point which does not satisfy a nature of the manifold on the curved surface, and it can be classified into the following two cases.

Figure 2A:
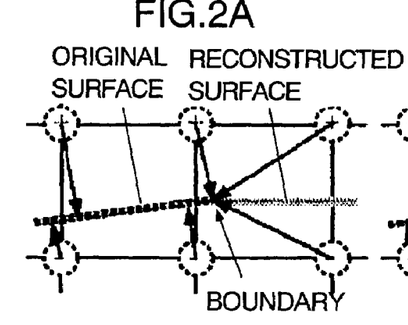
FIGS. 2A and 2B are two-dimensional schematic views showing a nonmanifold rendered in implicit function by a conventional method.

(1) Case where there is a boundary on the surface: a case where a point on a certain triangle boundary is not present on any other triangle boundaries. FIG. 2A shows a two-dimensional schematic example.

Figure 2B:
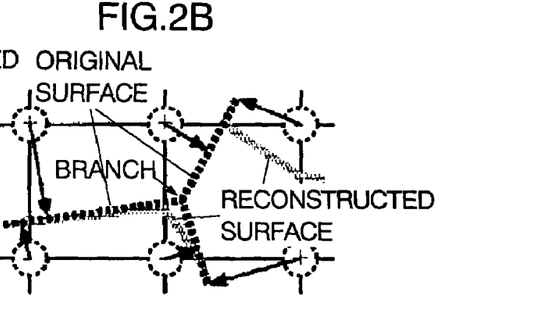

(2) Case where there is a branch on the surface: a case where a point on a certain triangle boundary is present on two or more different triangle boundaries. FIG. 2B shows a two-dimensional schematic example.

However, if two different triangles in an entered set of triangles share a point other than a boundary, these triangles are divided along a straight line which includes the shared point to prevent intersection between the triangles.

As shown in FIGS. 2A and 2B, when the conventional method is used to convert such nonmanifold shapes into implicit function curved surfaces, the shapes are greatly changed. Thus, in order to correctly render the nonmanifold in implicit function, characteristics thereof must be held in the implicit function field, and an algorithm must be formed to reconstruct it as a surface.

3.3 Designing of Distance Function and Interpolation Function

As described above in 3.1, in order to render the curved surface in implicit function by using the implicit function volume, it is necessary to define a distance function for constructing an implicit function field and an interpolation function for deciding a surface position. Consideration will be given to a method which properly defines such functions to render features of the two nonmanifolds described above in 3.2 within the framework of an implicit function curved surface.

Figure 3A:
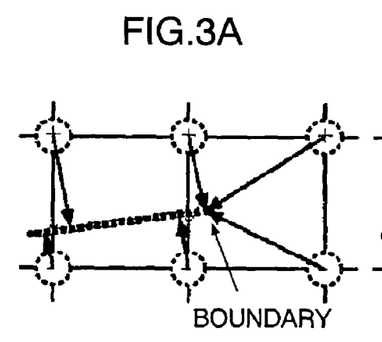
FIGS. 3A and 3B are two-dimensional schematic views showing a nonmanifold rendered in implicit function by a method of the present invention.
Figure 10A:
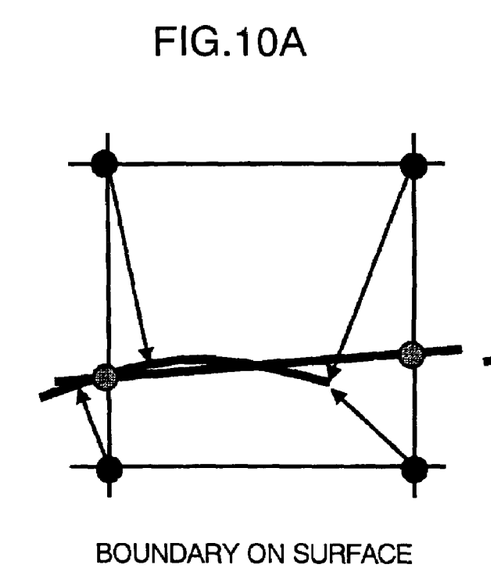
FIGS. 10A and 10B are two-dimensional schematic views similar to those of FIGS. 3A and 3B showing a nonmanifold shape rendered in implicit function by the method of the present invention.
Figure 11:
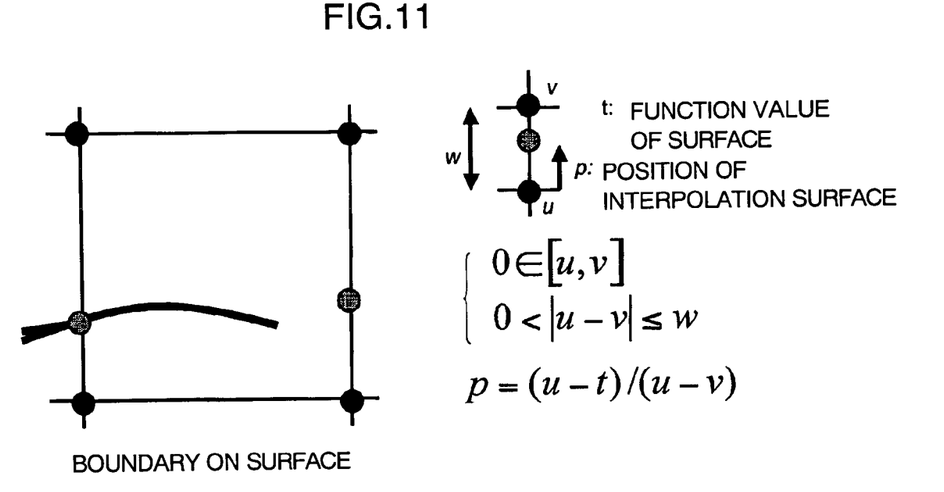
FIG. 11 is an explanatory view showing a distance function and its conditions when there is a boundary on a surface.

First, concerning the case where there is a boundary on the curved surface, in the conventional implicit function rendering, even if a boundary portion is extended, surfaces which have not been present originally are formed (FIG. 2A). This means that unnecessary surfaces are formed by interpolation even while a correct surface position is defined in an implicit function volume defined by using the conventional implicit function. Thus, by expanding the interpolation function to prevent formation of surfaces in positions where the original curved surface is not present, it is possible to render a surface boundary (FIG. 3A, FIG. 10A, FIG. 11).

In the case of using a code distance as a distance function, linear interpolation has been used as an interpolation function to decide a surface position. Thus, if this is expanded and a difference in code distances between two adjacent voxels to be interpolated is larger than a fixed width, no surfaces are formed between these voxels.

That is, if a space between two optional sample points is w, and values are u, v ($u \leq v$), only when the followings are all established, $$u \in (-\infty, t) \quad (2)$$

$$v \in [t, \infty) \quad (3)$$

$$0 < (-u) - t) + (v - t) < \alpha w \quad (4)$$

there is a surface between these two points. However, $\alpha (\geq 1)$ is a coefficient introduced to correctly form a surface even when conversion of a curved surface into an implicit function field includes an error.

If an implicit function field is given by a value which is obtained by subjecting a lattice point sample value to linear interpolation, a function value at a point in the space conceivably includes an error about half of a maximum lattice point space. Thus, the experiment uses $\alpha = 1.5$.

When the above three equations are satisfied, a position where a surface is present is obtained by the following equation:

$$q = (t-u)/(v-u) \quad (5)$$

However, $q (\in [0, 1])$ is normalized so that a value of a surface position can be on a lattice point of u when q=0 and on a lattice point of v when q=1.

Next, concerning the case where there is a branch on the surface, in the conventional implicit function rendering, a part of the surfaces connected at a branch potion is eliminated (FIG. 2B). This is caused by an impossibility of correctly rendering the surface position having the branch in an implicit function volume defined by using a continuous real valued function.

If a curved surface is a manifold, it is possible to define a front and a back of the surface in the vicinity of an optional point on the curved surface. Thus, the optional point on the surface is present in a portion held between two regions, i.e., a region where a nearest point is located in front side and a region where it is located in a backside, and such region division can be rendered by using a code distance function. However, since a front and a back of the surface cannot be defined if there is a branch on the surface to form a nonmanifold, especially a peripheral region of a point on a branch line cannot be classified into two kinds from the direction of the surface of the nearest point.

Figure 3B:
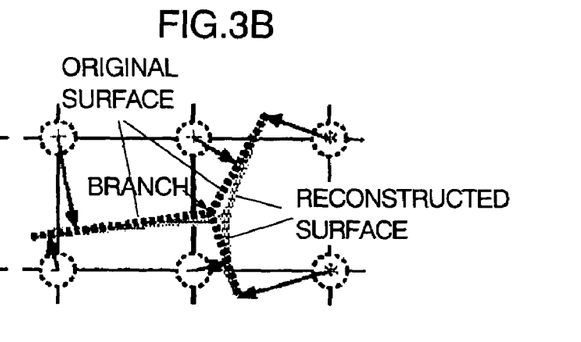
Figure 10B:
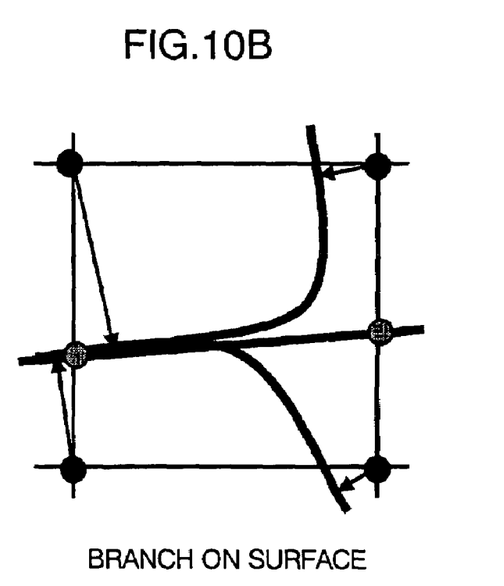
Figure 12:
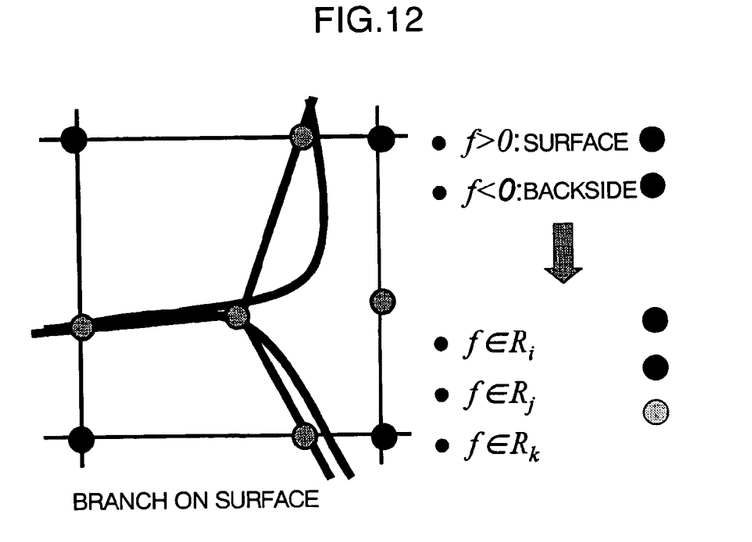
FIG. 12 is an explanatory view showing conditions when there is a branch on the surface.

The entered curved surface is broken down into curved surface patches to enable determination of its front and back, and numbers are allocated to the front and the back to distinguish them from each other, whereby the space is classified into a plurality of regions by using the number of the surface of the nearest point. In this way, the curved surface having a branch can be rendered in implicit function (FIG. 3B, FIG. 10B, FIG. 12). Hereinafter, an algorithm of the region division will be described.

(1) An entered nonmanifold curved surface is divided along a branch line, and broken into curved surface patches having no branches.
(2) Numbers i are allocated to the patches in an obtained order. A front and a back of each patch are distinguished from each other, a number of the front side is set to i$^+$, and a number of the backside is set to i$^-$.
(3) A space is subjected to sampling at a lattice point p, and Euclid distance $d_E(p)$ to the curved surface and a number i(p) of the surface of the nearest point are allocated to the lattice point.
(4) For each lattice point p, $i(p_n)$ is investigated at six adjacent points $p_n$, and a group of $(i(p), i(p_n))$ where $i(p) \neq i(p)$ is set is enumerated.
(5) Another new number is substituted for the prepared group of the numbers. However, if as a result of the substitution, the numbers which are first i$^+$ and i$^-$ become the same numbers, no substitution is carried out for the combination. Lastly, numbers are arrayed in order from 0.
(6) In accordance with a substitution table, the region number i(p) at each lattice point is rewritten.

An implicit function volume of a real value is constituted of the volume region number i(p) and the Euclid distance $d_E(p)$ to the surface at each voxel which are obtained in the aforementioned manner. Accordingly, a "region distance" where a code distance is expanded is defined. A "region" in the region distance is an expansion of two kinds of positive and negative "codes" in the code distance to an optional number, which is realized by dividing a real number space representing a distance into regions.

When a width of a divided region is $D_s$, a distance $d^i_s$ included in a region i is represented by the following:

$$d^i_s \in [D_s i, D_s(I+1)) \quad (6)$$

Such a region distance can be calculated by the following process.

First, $D_s = 2^B$ is set to decide a size of a region from $B = B_{max} - [\log_2 n]$. However, n is the number of regions. $B_{max}$ is a sufficiently large number, which is given as a bit number of a variable representing a region distance when it is rendered by the computer.

At this time, a region distance $f_s(p)$ is calculated from $d_E(p)$ and i(p) in a position p of each voxel by the following equation:

$$f_s(p) = \min(d_E, 2^B - \epsilon) + 2^B i(p) \quad (7)$$

Here, $\epsilon(>0)$ is a minute positive real number to round down $d_E(p)$ so that $f_s(p)$ can be included in a half-open section of (6). In the experiment, $\epsilon$ is set to a lattice point space, $B_{max} = 8$.

Figure 13:
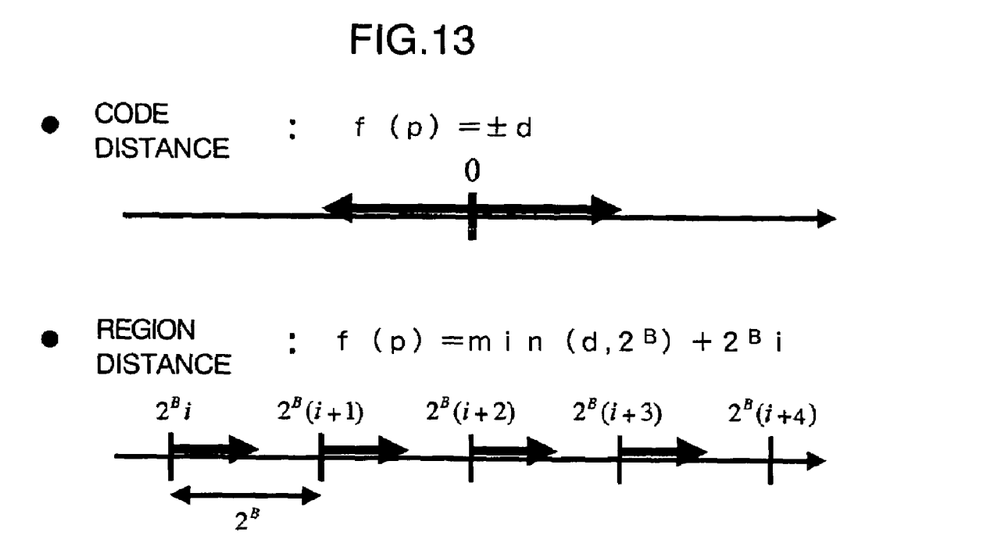
FIG. 13 is a schematic view showing a region distance function of the present invention.

Since the region distance function is not a continuous function, its value cannot be interpolated to be linear (see FIG. 13). Thus, if the number of regions in a given region distance field is n, a space between two sample points of the distance field is w, and values are u, v (u≦v), only when there is i, j (0≦i≦j≦n−1) where the followings are all established, $$u \in [2^B i, 2^B(i+1)) \quad (8)$$

$$v \in [2^B j, 2^B(j+1)) \quad (9)$$

$$0 < ((u-2^B i) + (v-2^B j)) < \alpha w \quad (10)$$

but $\alpha(\geq 1)$, there is a surface between these two points. $\alpha \geq 1$ is a coefficient used in the equation (5). At this time, a position where there is a surface can be obtained by the following equation:

$$q = (u-2^B i)/((u-2^B i) + (v-2^B j)) \quad (11)$$

Figure 14:
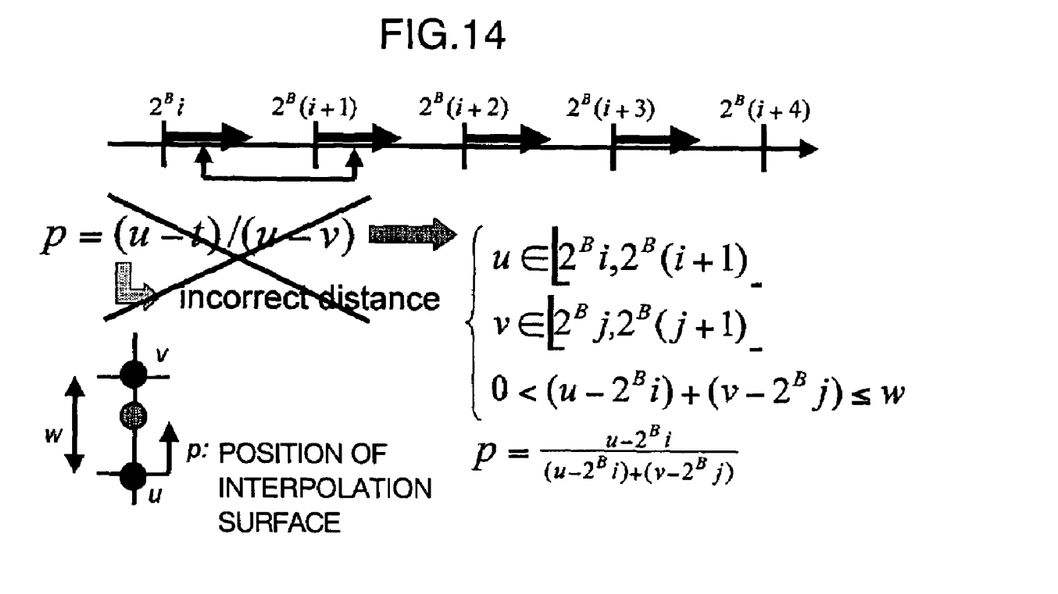
FIG. 14 is a schematic view showing the region distance function and its conditions of the present invention.
Figure 15A:
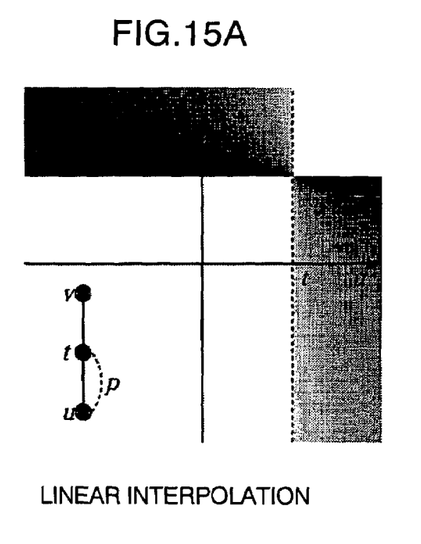
FIG. 15A is a view of an image on a display of linear interpolation.
Figure 15B:
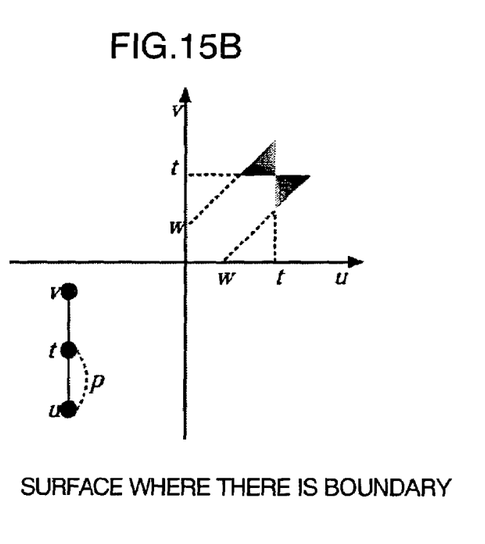
FIG. 15B is a view of an image on a display of a pre-integration table corresponding to the surface where there is a boundary.
Figure 16A:
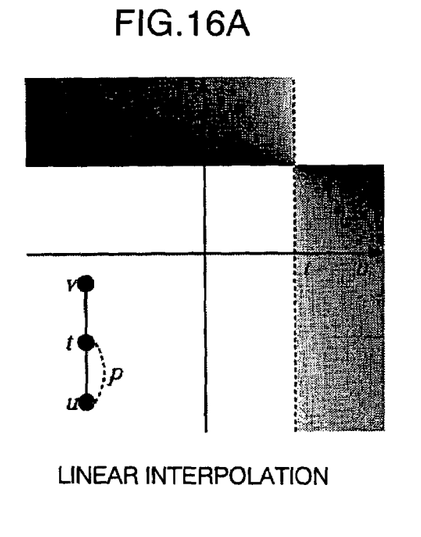
FIG. 16A is a view of an image on the display of linear interpolation.
Figure 16B:
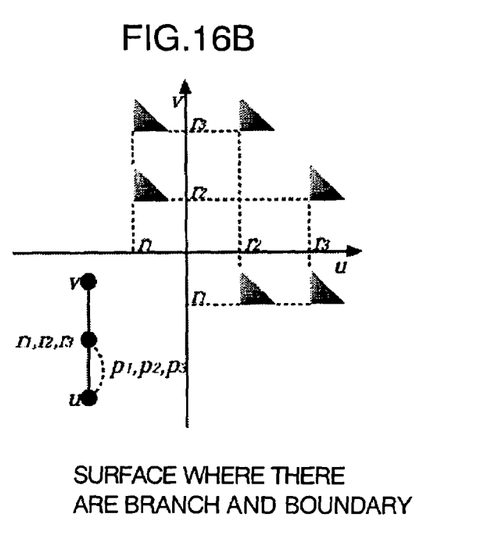
FIG. 16B is a view of an image on a display of a pre-integration table corresponding to the surface where there are a boundary and a branch.

Definition of q is similar to that of the equation (5). FIG. 14 is a schematic view showing the aforementioned region distance function and conditions thereof.

4. Visualization of Implicit Function Curved Surface 4.1 Volume Rendering Method Using Slice By applying a volume rendering method based on a ray casting method [Non-patent document 10] to an implicit function volume, it is possible to directly draw an implicit function curved surface.

Figure 4A:
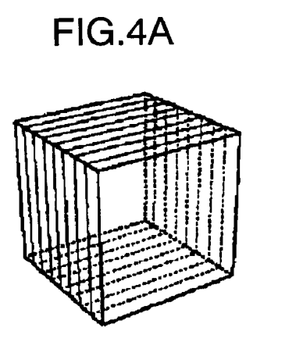
FIG. 4A is a schematic view of slice generation along a volume axis.

The ray casting is relatively costly calculation because of a need to sample a function value on an optional visual line. Lacroute et al. have presented a method which achieves a high drawing speed by rendering a volume in a set of three slices vertical to x, y, z axes (FIG. 4A), and carries out volume sampling only on a slice plane to increase calculation efficiency [Non-patent document 7].

This method can be efficiently mounted by using a polygon and a texture map [Non-patent document 4]. According to this method, a volume slice is mapped as a transparency 2D texture on a polygon, and a set of obtained semitransparent polygons is displayed by α blending from the deep side in order with respect to a visual line. In this display process, drawing acceleration of a graphics card can be used to carry out drawing at a high speed. Additionally, in the case of using the graphics card, by using a 3D texture function to always form polygons vertical to the visual line direction without fixing a slice direction for drawing (FIG. 4B), it is possible to carry out higher quality drawing in exchange for a slight reduction in a speed.

4.2 Pre-integration Method [Non-patent Document 5]

A big problem of the volume rendering using the slice is that while interpolation of a volume value is carried out by optional resolution on the slice, the interpolation is carried out only at a fixed slice space in a direction vertical to the slice, and thus uncoincidence in interpolation accuracy causes striped defects or cracks called moire to be observed. This problem can be prevented by changing the number of formed slices in accordance with necessary interpolation accuracy. However, the drawing speed and the number of slices are in inversely proportional relation to each other and, in most cases, it is not realistic to form slices where moire is negligible.

Concerning the problem, Engel et al. have presented a pre-integration method which simultaneously maps not only the volume value of the slice but also a volume value of an adjacent slice on each slice, and considers an influence of a volume present between the slices to eliminate moire.

Consideration will be given to a situation where a volume is rendered in a set of slices, and a slice $S_{front}$ indicated by front is drawn in polygon. According to the conventional slice method, this polygon is displayed by mapping a texture $T_{front}$ representing a volume value on the slice, and thus the volume value between the slices has no influence on a drawing result.

On the other hand, according to the pre-integration method, a texture $T_{back}$ on an adjacent slice indicated by back is mapped simultaneously with the $T_{front}$, and a volume value of a region surrounded with $S_{front}$ and $S_{back}$ is interpolated by using the two textures to be displayed. As a result, an influence of an entire volume including a region where no slice is present can be reflected in the drawing result. When an appearance on a certain visual line is actually drawn, a point of intersection between the visual line and the $S_{front}$, $S_{back}$ is calculated and, from a textural value $t_{front}$ of the front side and a textural value $t_{back}$ of the back side, an influence of a volume located on the visual line between the slices on a color and a degree of transparency is calculated to be displayed on a polygon.

Figure 5A:
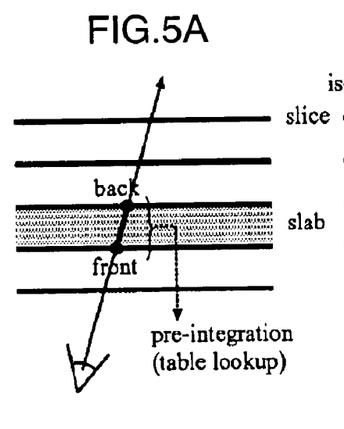
FIGS. 5A and 5B are drawing views using textures on two adjacent slices.
Figure 5B:
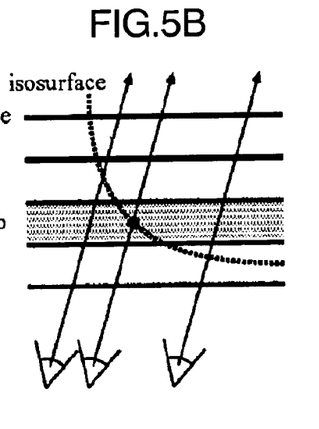

For example, as shown in FIG. 5B, consideration will be given to a situation where a surface is displayed by the volume rendering method using the slice. When an appearance on a center visual line in the drawing is considered, by the conventional method using the slice, the surface is not drawn because of no slices present on the surface. On the other hand, according to the pre-integration method, since a change in a voxel value between the slices can be considered, a correct result can be obtained even in drawing carried out by using a smaller number of slices.

From the group of the $t_{front}$, the $t_{back}$, a process of calculating an observed color and an observed degree of transparency is carried out beforehand, and a result is saved in a simplified chart called a pre-integration table, whereby the amount of calculation can be reduced. Additionally, the chart is saved as a two-dimensional texture in a graphics card, and referred to by using the texture combining function during drawing to enable a high-speed drawing process.

In setting of the graphics card to realize the above, used hardware is GeForce3 GPU by nVidia Inc., and a Texture harder function and a Register combiners function which constitute the texture combining function of this graphics card are programmed by using NVparse.

Figure 4B:
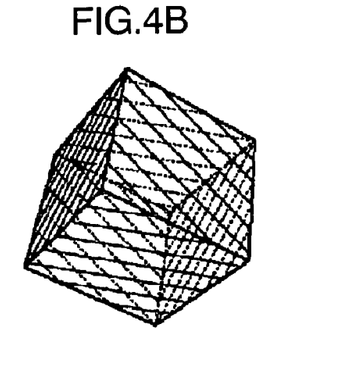
FIG. 4B is a schematic view of slice generation vertical to a drawing screen.

In the setting, 3D texture mapping is executed on the slice vertical to a screen of FIG. 4B to carry out drawing. The volume is irradiated with a light by fon shading. Accordingly, it is necessary to calculate a gradient of a scalar field given as a volume beforehand. When a scalar value s in each voxel and a gradient of a curved surface $(u_x, u_y, u_x)$ are given, a 3D texture having pixel values $(s, u_y, u_z, u_x)$ is formed therefrom to be read.

During the drawing, a multitexture function is used to read the 3D texture in texture units 0 and 1, and to provide a texture coordinate so as to take out the $t_{back}$ from the unit 0 and the $t_{front}$ from the unit 1. In the pre-integration table, a color for a group of optional scalar values rendered in 2D texture and given by $t_{front}$, $t_{back}$ is allocated to an RGB channel, a degree of transparency is allocated to an A channel.

However, in order to interpolate a gradient between the slices during irradiation calculation, a coefficient is allocated to the B channel to interpolate the gradient, and a color is actually rendered by only two channels of RG. When this texture is read into a unit 3, a texture coordinate for this unit is set by graphics hardware $(t_{front}, t_{back})$, and the pre-integration table is referred to.

4.3 Visualization Method of Implicit Function Curved Surface

In order to draw the implicit function curved surface rendered in the region distance field volume by the pre-integration method, the implicit function volume may be converted into a form to be used as a 3D texture and, for an optional region distance group constituted of $t_{front}$, $t_{back}$, a pre-integration table may be prepared to decide an interpolation color therebetween.

First, concerning the implicit function volume, a region distance is generally given by a real number. A distance is quantized by an 8-bit integer (0–255) to be used as a texture in a current graphics card. A gradient necessary for shading is calculated from a gradient of an original curved surface to be similarly quantized when the implicit function field is formed.

The pre-integration table is prepared as a two-dimensional RGB texture of a size 256×256. Colors allocated to the two channels of RG can be optionally set for each region distance group, and a single color is given when the surface is uniformly drawn. In the A channel, A=0 (transparent) is set when there are no surfaces between the slices, and A=1 (opaque) is set when there is a surface. Lastly, as an interpolation coefficient to be allocated to the B channel, a quantized value of $q \in [0, 1]$ by an 8-bit integer which is calculated by the equation (11) is used.

Figure 6A:
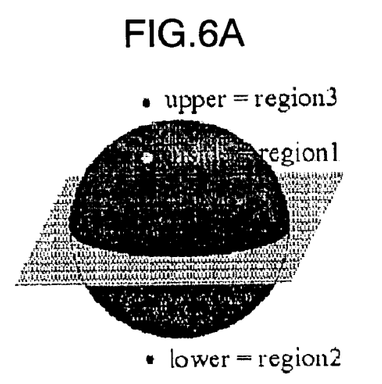
FIG. 6A is a view of an image on a display where a nonmanifold model is divided into regions.
Figure 6B:
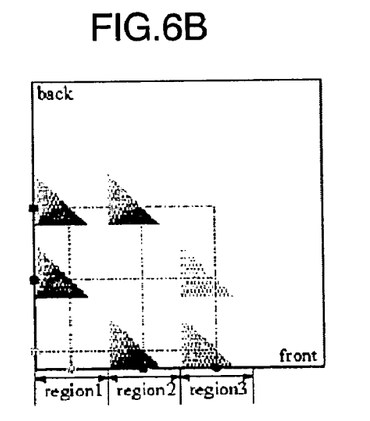
FIG. 6B is a view of an image on a display of a corresponding pre-integration table.

Consideration will be given to an example of rendering the nonmanifold curved surface of FIG. 6A in implicit function to make it visible. This model is a nonmanifold shape where a spherical surface is fitted into a plane, and a space can be classified into three regions. A corresponding pre-integration table is as shown in FIG. 6B. An abscissa of the table corresponds to $t_{front} \in [0, 255]$, and an ordinate corresponds to $t_{back} \in [0, 255]$. Colors of points of the table correspond to a combination of colors of the surface where a portion of no colors has no surfaces and drawn by a transparent color. Color strength corresponds to a coefficient for gradient interpolation. FIGS. 15A, 15B and FIGS. 16A, 16B show examples of other pre-integration tables.

Figure 7A:
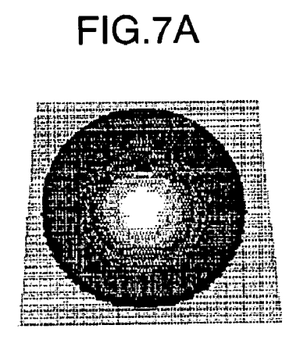
FIG. 7A is a view of an image on a display showing a defect when a value of a region distance field is subjected to linear interpolation.
Figure 7B:
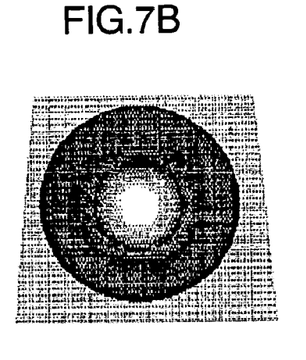
FIG. 7B is a view of an image on the display showing a case where a nearest point is taken to prevent the defect.

When the implicit function curved surface of the nonmanifold is made visible by the pre-integration method, it is necessary to prevent linear interpolation of a region distance of a voxel value given as a texture. For example, FIG. 7A shows a result of converting the nonmanifold curved surface of FIG. 16A into an implicit function volume, and carrying out linear interpolation of the voxel value to make it visible. By the linear interpolation, a distance which belongs to a region originally nonpresent near the region boundary is formed, and a surface which is not present originally appears. This defect can be solved by not carrying out the linear interpolation of the voxel value and, as a result, a correct display result can be obtained as shown in FIG. 7B.

5. Result of Experiment

Based on the foregoing method of the present invention, software for converting a triangle mesh into an implicit function volume, and software for displaying the volume in an implicit function curved surface were mounted to make experiments for a plurality of models. A computer used for the experiment of visualization was a PC having a CPU Pentium 4 1.7 GHz, a main memory of 1.0 GB, VPU GeForce 4 Ti4600, and VRAM of 128 MB. A volume renderer was prepared to carry out pre-integration by using a slice horizontal to a drawing plane as visualization software.

Figure 8A:
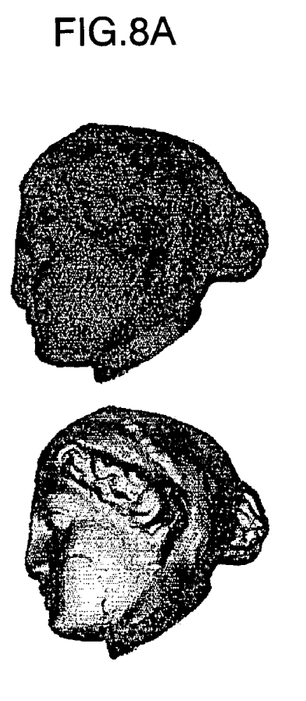
FIGS. 8A, 8B, 8C are views of images on the display showing entered triangle mesh models (upper stage) and visible drawings (lower stage) of the present invention.
Figure 8B:
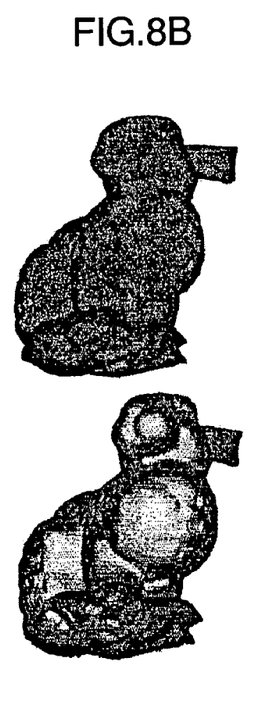
Figure 8C:
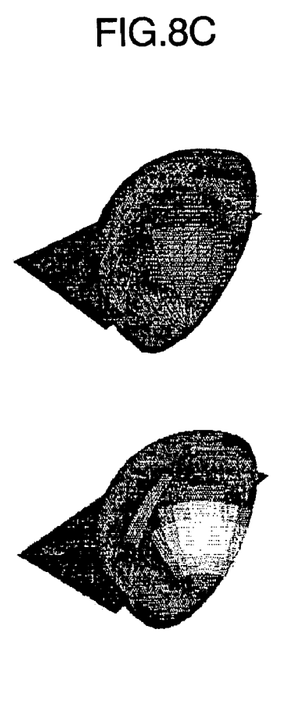

Each of FIGS. 8A to 8C shows a result of converting a nonmanifold surface model into implicit function rendering and making it visible. An upper stage is a parametric-rendered surface model given as an entry, and a triangle mesh is used. A lower stage shows a result of converting such a model into an implicit function volume of a size $256^3$ by using a region distance field, and making it visible.

Holes are partially bored in the models shown in FIGS. 8A and 8B, constituting nonmanifolds where there are boundaries on surfaces. According to the method of the present invention, the curved surface having a boundary which the conventional implicit function rendering cannot deal with can be rendered. However, since the implicit function field is sampled by a volume, it is impossible to accurately render characteristics of a shape equal to/lower than a voxel width, and especially a shape near the boundary is slightly changed. This problem can be solved by increasing a volume sampling density.

FIG. 8C shows a result of an experiment for a surface shape constituted of a plane and a semispherical surface. This surface is a nonmanifold having a boundary line and a branch, but it can be understood that a boundary and a branch can be correctly rendered by the method of the present invention. A value and a gradient of a distance function are subjected to 8-bit quantization to carry out nearest point interpolation. However, since drawing colors are decided by a combination of two textural values, quantization noise is hardly heard in a result image as long as a drawing surface is not extremely large. Colors during drawing can be set by distinguishing the front side from the backside for each pair of regions where there is a surface. In this example, different colors are set for all combinations.

Figure 17A:
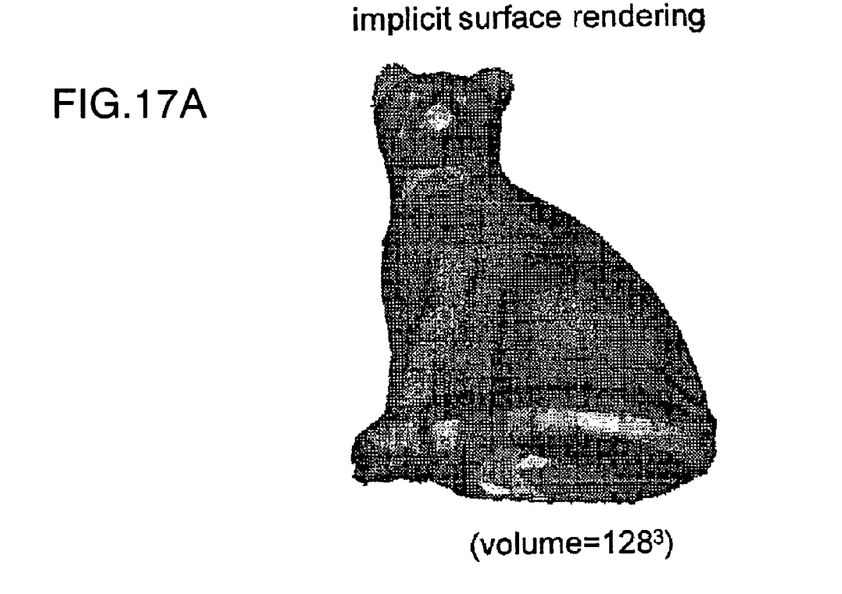
FIGS. 17A and 17B are views of images on displays similar to those of FIGS. 8A to 8C showing visible drawings of the present invention.
Figure 17B:
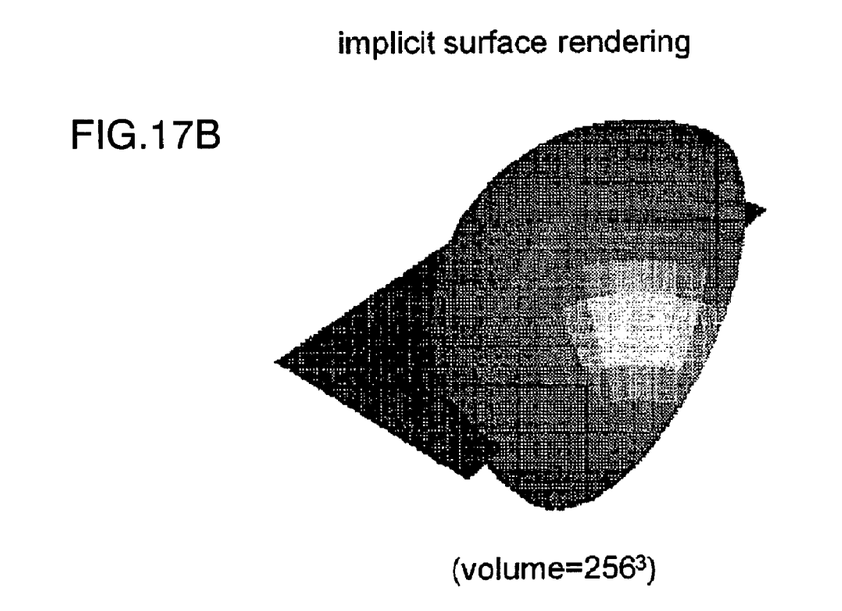

FIGS. 17A, 17B show images on displays similar to those of FIGS. 8A to 8C which are made visible according to the present invention.

Table 1 shows a drawing speed when visualization is carried out for volume data of sizes $128^3$ and $256^3$. The speed is changed by changing the number of formed slices, and many experiments show results of achieving 30 fps necessary for an interactive speed.

TABLE 1

| | Size of volume | | | | | | | |
|---|---|---|---|---|---|---|---|---|
| | $128^3$ | | | | $256^3$ | | | |
| Number of slices | 32 | 64 | 128 | 256 | 32 | 64 | 128 | 256 |
| FPS | >30 | >30 | 25.0 | 12.3 | 9.9 | 5.5 | 2.8 | 1.5 |

As described above, according to the present invention, by using the distance function for defining the implicit function curved surface and the discontinuous function as the interpolation function, expansion is made to handle the nonmanifold curved surface in implicit function rendering. Additionally, the method which draws such defined manifold/nonmanifold implicit function curved surface at a high speed is provided.

The entered parametric curved surface used in the experiment is only a triangle mesh, but the present invention can be applied to a free curved surface. However, tiny changes are necessary in an algorithm or the like for dividing the free curved surface into manifold patches, and experiments will have to be made in the future. Furthermore, the implicit function rendering of the curved surface is effective when deformation of the shape and a set operation are carried out. However, these processes can be applied to the rendering of the nonmanifold implicit function curved surface defined by the method of the present invention.

Many limitations placed on shapes to be handled in the conventional implicit function curved surface, and big problems of the surface boundary and the surface branch can be solved by the method of the present invention.

As in the foregoing embodiment, based on the method of the present invention, by mounting the software for converting the triangle mesh into the implicit function volume and the software for rendering the volume in the implicit function curved surface as the computer programs, even updating of the implicit function curved surface by deformation or the like can be dealt with at a high speed, and drawing can be carried out at a high speed even if the shape is complex, whereby the implicit function field can be displayed at an interactive speed.

As described above, the nonmanifold implicit function rendering method, the direction drawing method of the implicit function curved surface and the programs of the present invention are highly advantageous in that if there are nonmanifold characteristics in an entry, for example, if there is a boundary or a branch on the curved surface, the nonmanifold curved surface can be converted from parametric rendering into implicit function rendering while the shape can be correctly held, even updating of the implicit function curved surface by deformation or the like can be dealt with at a high speed, drawing can be carried out at a high speed even if the shape is complex, and accordingly the implicit function field can be displayed at an interactive speed.

Some preferred embodiments of the present invention have been described. However, it can be understood that scope of rights included in the present invention is not limited to the embodiments. On the contrary, the scope of rights of the present invention includes all improvements, modifications and equivalents specified in appended claims.

The invention claimed is:

1. An implicit function rendering method of a nonmanifold, characterized in that:
   (1) an input nonmanifold curved surface is divided along a branch line, broken down into curved surface patches having no branches;
   (2) numbers i are allocated to the patches in an obtained order, a front and a back of each patch are distinguished from each other, a number $i^+$ is given to the front, and a number $i^-$ is given to the back;
   (3) a space is sampled by a lattice point p; and
   Euclid distance $d_E(p)$ to the curved surface and number i(p) of a surface of a nearest point are allocated to the lattice point;
   (4) for each lattice point p, $i(p_n)$ is determined at six adjacent points $p_n$, and groups of $(i(p), i(p_n))$ where $i(p) \neq i(p_n)$ are enumerated;
   (5) a group of new numbers are substituted for the group of numbers allocated above, but if the numbers which are first $i^+$ and $i^-$ become the same numbers as a result of the substitution, no substitution is carried out for a combination thereof, whereby numbers are arrayed in order from 0 after said substitution; and
   (6) in accordance with a substitution table, a region number i(p) is rewritten at each lattice point p, and an implicit volume function of a real value is comprised of the obtained volume region number i(p) and the Euclid distance $d_E(p)$ to the surface at each voxel, wherein $$d_E = \sqrt{(x-X)^2 + (y-Y)^2 + (z-Z)^2}$$

where the coordinate (x, y, z) is a lattice point, and the coordinate (X, Y, Z) is the point closest to a curved surface from the lattice point; and
   (7) rendering and displaying an implicit function curved surface from the implicit volume function of the real value.

2. The implicit function rendering method according to claim 1, characterized in that:
   a distance $d_s^i$ included in a distance i is as follows:

$$d_s^i \in [D_s i, D_s(i+1)) \tag{6}$$

wherein $D_s$ is a width of each divided region of a real valued space representing a distance; and in a position p of each voxel, a region distance $f_s(p)$ is calculated from $d_E(p)$ and $i(p)$ by the following equation:

$$f_s(p)=\min(d_E, 2^B-\epsilon)+2^B i(p) \quad (7),$$

$\epsilon(>0)$ is set to a minute positive real number to round down $d_E(p)$ so that fs(p) can be included in a half-open section of (6).

3. The implicit function rendering method according to claim 1, characterized in that:

only when the followings are all satisfied, $$u \in (2^B i, 2^B(i+1)) \quad (8)$$

$$v \in [2^B j, 2^B(j+1)) \quad (9)$$

$$0<(u-2^B i)+(v-2^B j)<\alpha w \quad (10)$$

but $i, j$ $(0 \leq i \leq j \leq n-1)$, $\alpha(\geq 1)$, wherein w is a space between two optional sample points; and u and v ($u \leq v$) are values, respectively, there is a surface between these two points wherein with respect to two sample points A and B, the designations i, j, u, v, n, and α are defined as follows
i=region number of the point A,
j=region number of the point B,
u=region distance of the point A,
v=region distance of the point B,
n=total number of regions in which the region code distance is defined,
α=a parameter that makes it possible to generate a cured surface between the points A and B, even if the curved surface exists between the points A and B, and the points closest to the curved surface do no conform to each other, and wherein $2^B$ is a range of permissible region distance values in one dimension.

4. The implicit function rendering method according to claim 1, characterized in that:

a surface position $q(\in[0, 1])$ is normalized so that a value can be on a lattice point of u when q=0 and can be on a lattice point of v when q=1; and the position q where there is a surface is obtained by the following equation:

$$q=(u-2^B i)/((u-2^B i)+(v-2^B j)) \quad (11),$$

wherein $2^B$ is a range of permissible region distance values in one dimension.

5. The implicit function rendering method of a nonmanifold, characterized in that:
(1) an input nonmanifold curved surface is divided along a branch line, broken down into curved surface patches having no branches;
(2) numbers i are allocated to the patches in an obtained order, a front and a back of each patch are distinguished from each other, a number $i^+$ is given to the front, and a number $i^-$ is given to the back;
(3) a space is sampled by a lattice point p; and
Euclid distance $d_E(p)$ to the curved surface and number $i(p)$ of a surface of a nearest point are allocated to the lattice point;
(4) for each lattice point p, $i(p_n)$ is determined at six adjacent points $p_n$, and groups of $(i(p), i(p_n))$ where $i(p) \neq i(p_n)$ are enumerated;
(5) a group of new numbers are substituted for the group of numbers allocated above, but if the numbers which are first $i^+$ and $i^-$ become the same numbers as a result of the substitution, no substitution is carried out for a combination thereof, whereby numbers are arrayed in order from 0 after said substitution; (6) in accordance with a substitution table, a region number $i(p)$ is rewritten at each lattice point p, and an implicit volume function of a real value is comprised of the obtained volume region number $i(p)$ and the Euclic distance $d_E(p)$ to the surface at each voxel, wherein $$d_E=\sqrt{(x-X)^2+(y-Y)^2+(z-Z)^2}$$

where the coordinate (x, y, z) is a lattice point, and the coordinate (X, Y, Z) is the point closest to a curved surface from the lattice point; and
(7) rendering an implicit function curved surface from the implicit volume function of the real value to a display.

* * * * *